United States Patent
Mukhopadhyay et al.

(10) Patent No.: US 9,519,073 B2
(45) Date of Patent: Dec. 13, 2016

(54) DIFFERENTIAL PHASE SEMBLANCE APPARATUS, SYSTEMS, AND METHODS

(71) Applicant: Halliburton Energy Services, Inc., Houston, TX (US)

(72) Inventors: Pradip Kumar Mukhopadhyay, Houston, TX (US); Arthur Cheng, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/427,876

(22) PCT Filed: Nov. 1, 2012

(86) PCT No.: PCT/US2012/062986
§ 371 (c)(1),
(2) Date: Mar. 12, 2015

(87) PCT Pub. No.: WO2014/070182
PCT Pub. Date: May 8, 2014

(65) Prior Publication Data
US 2015/0253447 A1 Sep. 10, 2015

(51) Int. Cl.
*G01V 1/50* (2006.01)
*G01V 1/48* (2006.01)
(Continued)

(52) U.S. Cl.
CPC . *G01V 1/48* (2013.01); *G01V 1/24* (2013.01); *G01V 1/32* (2013.01); *G01V 1/325* (2013.01);
(Continued)

(58) Field of Classification Search
USPC .......................................................... 702/6
See application file for complete search history.

(56) References Cited

U.S. PATENT DOCUMENTS 4,562,556 A  12/1985  Ingram et al.
4,575,830 A   3/1986  Ingram et al.
(Continued)

FOREIGN PATENT DOCUMENTS

WO  WO-2014070182 A1  5/2014

OTHER PUBLICATIONS

"International Application Serial No. PCT/US2012/062986, International Preliminary Report on Patentability mailed Nov. 21, 2014", 4 pgs.

(Continued)

*Primary Examiner* — Paul D Lee
(74) *Attorney, Agent, or Firm* — Schwegman, Lundberg & Woessner, P.A.; Benjamin Fite

(57) ABSTRACT

In some embodiments, apparatus and systems, as well as methods, may operate to shift signal data associated with a set of receivers, in time or phase with respect to signal data associated with a receiver reference point, to transform the signal data into shifted data, wherein the signal data corresponds to energy waves propagated through a geological formation before being received by the set of receivers; to multiply the shifted data by a complex conjugate of the signal data associated with the receiver reference point to provide differential phase values; to sum and average the differential phase values to provide differential phase semblance values; and to publish the differential phase semblance values, or information derived from the differential phase semblance values to one of a storage medium, a hardcopy printout, or a display. Additional apparatus, systems, and methods are disclosed.

22 Claims, 11 Drawing Sheets

(51) Int. Cl.
  *G01V 1/24* (2006.01)
  *G01V 1/32* (2006.01)
  *G01V 1/22* (2006.01)
  *G01V 1/34* (2006.01)
  *G01V 1/18* (2006.01)

(52) U.S. Cl.
  CPC .............. *G01V 1/184* (2013.01); *G01V 1/22* (2013.01); *G01V 1/34* (2013.01); *G01V 2200/16* (2013.01); *G01V 2210/1299* (2013.01); *G01V 2210/1429* (2013.01); *G01V 2210/43* (2013.01); *G01V 2210/48* (2013.01); *G01V 2210/6222* (2013.01)

(56) References Cited

U.S. PATENT DOCUMENTS

| | | | |
|---|---|---|---|
| 5,077,697 A | | 12/1991 | Chang |
| 5,999,561 A | * | 12/1999 | Naden et al. .............. 375/142 |
| 6,636,810 B1 | | 10/2003 | Moore et al. |
| 7,089,119 B2 | | 8/2006 | Mandal |
| 7,646,673 B2 | | 1/2010 | Akhmetsafin et al. |
| 9,001,619 B2 | * | 4/2015 | Diller et al. .................. 367/38 |
| 2004/0199331 A1 | | 10/2004 | Mandal |
| 2008/0123468 A1 | * | 5/2008 | Akhmetsafin et al. ........ 367/25 |
| 2009/0005995 A1 | | 1/2009 | Tang et al. |
| 2009/0010104 A1 | | 1/2009 | Leaney |
| 2009/0067286 A1 | | 3/2009 | Bose et al. |
| 2010/0030479 A1 | * | 2/2010 | Higginbotham et al. ...... 702/18 |

OTHER PUBLICATIONS

"International Application Serial No. PCT/US2012/062986, International Search Report mailed Jan. 22, 2013", 2 pgs.
"International Application Serial No. PCT/US2012/062986, Written Opinion mailed Jan. 22, 2013", 6 pgs.
"European Application Serial No. 12887372.6, Extended European Search Report mailed Oct. 27, 2015", 11 pgs.
Canadian Application Serial No. 2,888,529, Office Action mailed Jul. 5, 2016, 4 pgs.
European Application Serial No. 12887372.6, Office Action mailed Sep. 8, 2016, 10 pgs.

* cited by examiner

US 9,519,073 B2

DIFFERENTIAL PHASE SEMBLANCE APPARATUS, SYSTEMS, AND METHODS

PRIORITY APPLICATIONS

This application is a U.S. National Stage Filing under 35 U.S.C. 371 from International Application No. PCT/US2012/062986, filed on 1 Nov. 2012, and published as WO 2014/070182 A1 on 8 May 2014, which applications and publication are incorporated herein by reference in their entirety.

BACKGROUND

For some time, acoustic logging has been a useful source of high resolution subsurface information, including formation slowness, anisotropy, and porosity. Array-based tools that make use of acoustic data processing can serve as the basis for extracting such information. While the estimates of formation slowness (and other characteristics) that can be obtained in this way are useful, competitive pressures continue to drive advancements in resolution and accuracy.

DETAILED DESCRIPTION

Introduction

The various embodiments described herein operate to provide an improved mechanism for processing down hole log information. In this case, an advanced processing technique has been designed to use differential phase values between different tool-based array signals, present in the time and frequency domains, to obtain coherence semblance images. The coherence semblance image provides formation slowness information with high resolution, and can be used for the error estimation of predicted formation slowness. The various embodiments provide a more accurate estimate of formation slowness than the time or frequency semblance algorithms currently in use by others.

Previous attempts to solve the phase coherence based semblance problem did not include the differential phase concept. The mechanism described herein operates to exclude destructive interference, which is present in typical phase semblance processing. This new mechanism, based on the use of differential phase, can also make use of waveform stacking, where the signal reference point (e.g., the physical location of a designated reference receiver) can be moved in space to reduce incoherent noise.

Data Acquisition

Figure 1:
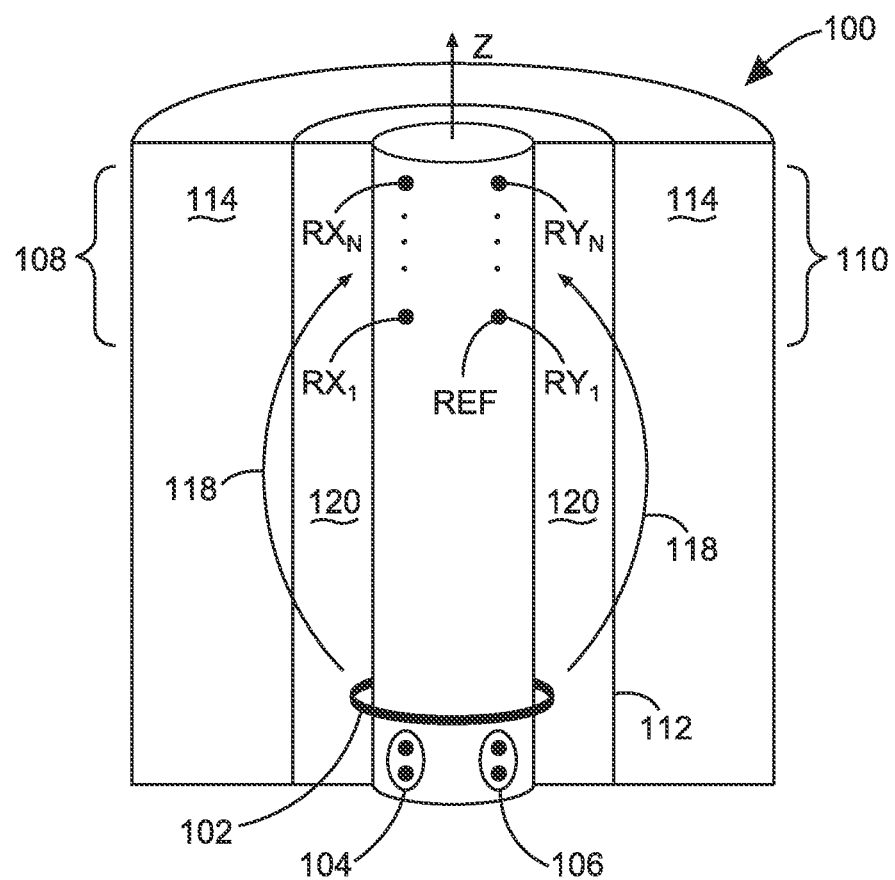
FIG. 1 is a front, cut-away view of an apparatus, in the form of a down hole tool, according to various embodiments of the invention.

FIG. 1 is a front, cut-away view of an apparatus 100, in the form of a down hole tool, according to various embodiments of the invention. One or more transmitting sources (e.g., a monopole transmitter 102, X and Y dipole transmitters 104, 106, respectively) are used to create energy (pressure) waves 118 that travel in the borehole fluid 120 and the formation 114, to be received at the receivers $RX_N$, $RY_N$ (e.g., at the X receiver array 108 and the Y receiver array 110) located at different spatial locations within the borehole 112.

Here the apparatus 100 is shown in the form of an acoustic tool with monopole and dipole transmitting sources 102; and 104, 106, respectively. The apparatus 100 is disposed in a borehole 112, with its longitudinal axis substantially aligned with the Z-axis. This apparatus can be used in conjunction with the signal processing techniques described herein.

In some embodiments, as illustrated in FIG. 1, an acoustic tool apparatus 100 includes an acoustic source (transmitter), and a set of receivers $RX_N$, $RY_N$ that are spatially separated from each other by distances ranging from several inches to several feet. The apparatus 100 comprises two azimuthally orthogonal dipole-transmitter sources, the X-dipole transmitter source 104, and the Y-dipole transmitter source 106. These sources 104, 106 can be used to excite the flexural mode. The apparatus 100 may also include a ring transmitter source 102 to excite a monopole mode.

The apparatus 100 also includes two azimuthally orthogonal receiver arrays 108, 110, aligned along the X and Y direction respectively, to record the pressure waveforms resulting from the energy waves 118 transmitted into the formation 114. Each receiver array 108, 110 has front and back receivers to form sum and difference channels. When the dipole transmitters 104, 106 are activated, the difference channels are used to record cross-dipole waveforms.

Specified in the traditional way, the recorded flexural waveforms can be denoted by in-line components, (XX, YY), and cross-line components, (XY, YX). The first letter refers to the transmitter, and the second letter to the receiver. Thus, for example, the XX recorded waveform is formed by firing the X-directed dipole transmitter and receiving the difference channel of the X-directed receiver array. When the ring source 102 is activated, the sum channel is used to record different propagation modes, such as, compressional, refracted shear, Stoneley and pseudo-Rayleigh modes, among others. While the apparatus 100, as shown in FIG. 1, is useful to describe the details of the processing mechanism described herein, the particular arrangement of transmitters and receivers is not meant to limit the scope of any of the embodiments. Other physical arrangements of the sources 102, 104, 106 and the receivers $RX_N$, $RY_N$ are possible.

Processing Methods

Figure 2:
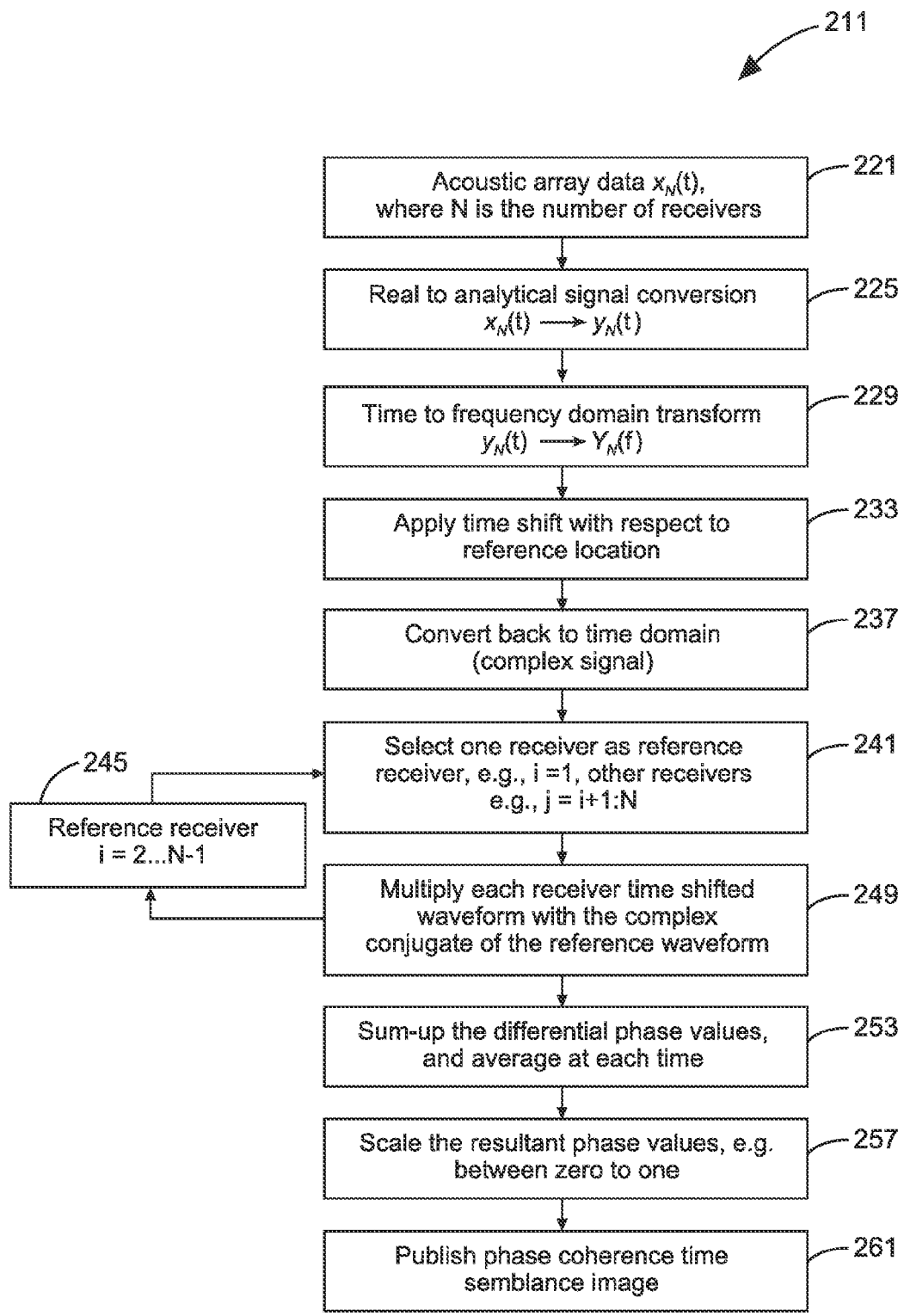
FIG. 2 is a flow chart illustrating differential phase semblance processing methods in the time domain, according to various embodiments of the invention.

FIG. 2 is a flow chart illustrating differential phase semblance processing methods 211 in the time domain, according to various embodiments of the invention. In the workflow shown in FIG. 2, a physical reference point is chosen with respect to the array of receivers. For example, among the array of receivers, a specific one of the receivers may be chosen as a reference receiver, with the center of its physical location (or the center of its reception) chosen as a reference point.

The real signals received from each receiver in the array at block 221 are converted to analytical signals at block 225. At block 229, the analytical signals in the time domain are transformed into frequency domain signals.

At block 233, the frequency domain signals are shifted in time, being multiplied with appropriate phase delay which is related to the time delay between a receiver location and the reference location. Then, at block 237, the complex version of the real signals are transformed back into the time domain, to provide the time shifted version of the original signal.

It should be noted that in various embodiments, any physical location can be selected as a reference location, including locations inside of the physical boundaries of the array, and outside of those boundaries. If the reference location is not selected to coincide with a "reference" receiver, then the signals from all receivers in the array are subjected to time shifting operations. However, if the reference location is conveniently selected to be the same as the center of reception of a "reference" receiver, then the signals provided by the reference receiver are not subjected to time shifting operations, because the shifting operations are conducted with respect to the reference receiver location itself.

The time shifted waveforms are then multiplied with the complex conjugate of the reference waveform at block 249 and the differential phase values are added and averaged at each time for a given slowness at block 252. In an ideal case, there is zero phase difference at a given slowness, where the slowness matches with the slowness at which a particular wave travels, and a non-zero value elsewhere. These values are then scaled in the range of zero to one to form the phase coherence image (FIGS. 9A & 9B) at blocks 257 and 259, where the image is displayed with respect to time and slowness.

In some embodiments, the shifted waveform data with respect to a reference location can be stacked. In the process of stacking, each receiver acts as a reference receiver once, and its signals are multiplied with the complex conjugate of the remaining receiver waveform data, and the real and imaginary parts are added. In the process of addition, the differential phase (which is common) is considered once.

When stacking is used to help reduce the amount of incoherent noise, the received energy waveform (signal) is recorded at one of the receivers in the array, such as receiver $x_N(t)$, where N is the number of receiver. The recorded real-valued waveforms are then converted to their analytical form $y_N(t)$. This conversion process is well-known to those of ordinary skill in the art. Readers that desire to learn more about the conversion process are encouraged to consult "Computing the Discrete-Time "Analytic" Signal via FFT", Marple, L., Jr., IEEE Transactions on Signal Processing, Vol. 47, No. 9, pgs. 2600-2603, 1999.

For example, at block 241, one of the receivers may be chosen as a reference receiver, such as $y_{ref}(t)$. A relative time shift with respect to the reference location (e.g., the location of the center of reception by the reference receiver) is applied to the waveforms as shown in equation (1):

$$y_i(t) = ifft(X_i(f) * e^{-i\omega s d_i}), \quad (1)$$

where $y_i(t)$ is the time shifted receiver waveform, i is the receiver number, $\omega$ is the angular frequency, s is the slowness, $d_i$ is the physical distance of the i-th receiver from the reference location, and ifft symbolizes the inverse Fourier transform.

The time shifted waveforms are then multiplied by the complex conjugate of the reference receiver waveform at block 249. When stacking, multiplication can be performed by taking each receiver once, in turn, as the reference receiver, at block 245. The differential phase at each time and a given slowness value is then added and averaged at block 253, as shown in equation (2):

$$\phi(t \cdot s) = \tan^{-1}\left[\frac{\frac{1}{\sum_{k=1}^{N}(N-k)}\sum_{i=1}^{N-1}\sum_{j=1}^{N-i}\text{real}\{Y_i(t) * Y_{i+j}^*(t)\}}{\frac{1}{\sum_{k=1}^{N}(N-k)}\sum_{i=1}^{N-1}\sum_{j=1}^{N-i}\text{imag}\{Y_i(t) * Y_{i+j}^*(t)\}}\right], \quad (2)$$

where $\phi$ represents a phase operator of a complex number, $Y^*(t)$ is the complex conjugate of $Y(t)$ and real and imag are the real and imaginary parts of a complex number, respectively, over receivers 1 to N. It is to be noted that the "differential phase semblance" values obtained by using this mechanism, which represent a difference in phase values, are not the same thing as the "differential semblance" values that represent a difference in the amplitude of semblance values, and which are commonly known in the art.

Note that in this stacking operation the common values are considered only once. For example, of the two values $\phi_{12}(t,s)$ and $\phi_{21}(t,s)$, only one is considered, since each is of the same magnitude, differing only in sign (such that considering them both will result in mutual cancellation).

The phase image values are then scaled at block 257, perhaps to have a magnitude between zero to one (where zero indicates no coherence between energy waves, and one indicates complete coherence between energy waves), with the resultant image being published to a display, hardcopy printout, or a storage device at block 261. The published image is known as a phase coherence time semblance image.

Ideally, an image with resultant zero phase values indicates a perfect match between different array waveforms at that slowness value, which in turn indicates a particular wave propagation slowness (velocity) at that location in the formation. For non-dispersive wave propagation, a substantially horizontally-shaped area that includes the highest coherence values in the coherence image appears, where the extent of the horizontal section is approximately equal to the total time duration of a particular type of arrival (e.g., compressional).

Figure 3:
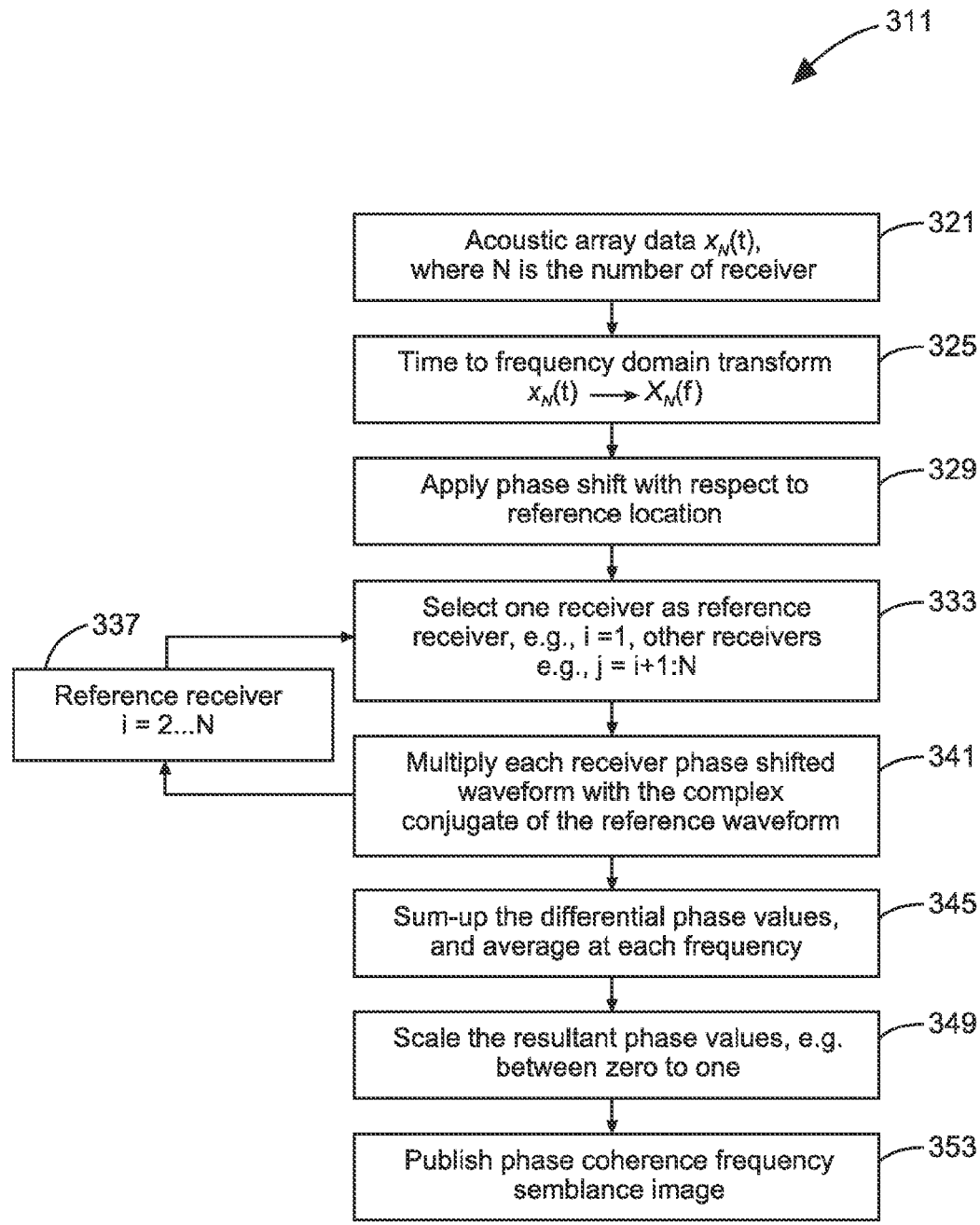
FIG. 3 is a flow chart illustrating differential phase semblance processing methods in the frequency domain, according to various embodiments of the invention.

FIG. 3 is a flow chart illustrating differential phase semblance processing methods 311 in the frequency domain, according to various embodiments of the invention. In this workflow, after real-valued energy waveforms are received in the time domain at block 321, the time domain waveforms are transformed into the frequency domain at block 325.

At block 329, a phase shifting correction is applied to the transformed waveforms, which corresponds to the relative time difference between the different waveforms provided by receivers in the array, with respect to the reference location. These phase-corrected frequency domain waveforms are then multiplied with the complex conjugate of the reference location waveform at block 341. At block 345, the resulting differential phase values are added and averaged at each frequency for a given slowness.

The minimum phases of the resulting waveforms with respect to each frequency are indicative of the slowness for each particular wave. These values are may then be scaled at block 349, perhaps in the range of zero to one, as noted previously. These scaled values can be assembled to form a phase coherence image in the frequency domain at block 353.

Thus, the time domain waveforms are first converted to the frequency domain X(f) at block 325. A receiver is chosen as a reference receiver at block 333, perhaps a receiver at the center of the array, $X_{ref}(f)$. A relative phase shift with respect to the reference location/receiver is then applied to the waveforms as shown in equation (3):

$$Y_i(f) = X_i(f) * e^{-i\omega s d_i}, \quad (3)$$

where $Y_i(f)$ is the frequency domain phase shifted receiver waveform, i is the receiver number, $\omega$ is the angular frequency, s is the slowness, and $d_i$ is the distance of the i-th receiver from the reference location.

The phase corrected frequency domain waveforms are then multiplied by the complex conjugate of the reference receiver waveform at block 341. For waveform stacking, this operation can be performed by taking each receiver once as a reference receiver, at block 337.

At block 345, the phase of the resulting waveforms are added and averaged at each value of frequency and slowness, as shown in equation (4):

$$\phi(f \cdot s) = \tan^{-1}\left[\frac{\frac{1}{\sum_{k=1}^{N}(N-k)}\sum_{i=1}^{N-1}\sum_{j=1}^{N-i}\text{real}\{Y_i(f)*Y_{i+j}^*(f)\}}{\frac{1}{\sum_{k=1}^{N}(N-k)}\sum_{i=1}^{N-1}\sum_{j=1}^{N-i}\text{imag}\{Y_i(f)*Y_{i+j}^*(f)\}}\right], \quad (4)$$

where $\phi(f,s)$ is the frequency coherence value at a frequency f and slowness s, $Y^*(f)$ is the complex conjugate of Y(f), and real and imag are the real and imaginary parts of a complex number, over receivers 1 to N.

Note again that in the stacking operation, the common values are considered only once to prevent cancellation (e.g., $\phi_{12}(f,s)$ and $\phi_{21}(f,s)$ are considered once). After scaling at block 349, the resulting frequency coherence values are displayed with respect to frequency and slowness, to form a phase coherence frequency semblance image that is published at block 353.

Figure 8A:
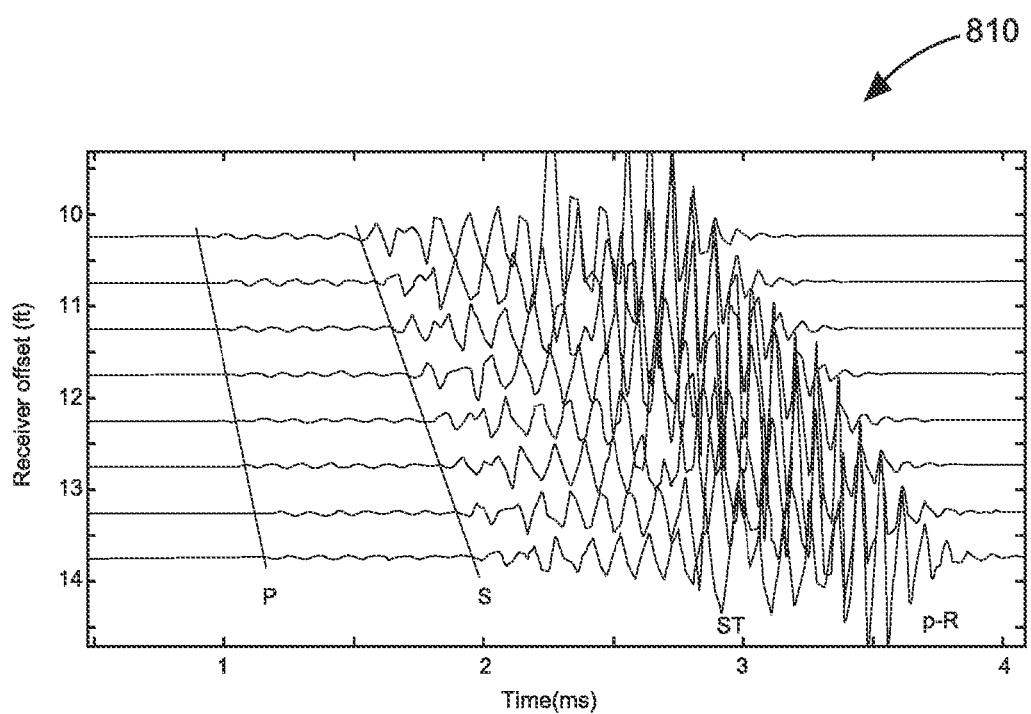
FIGS. 8A and 8B include graphs illustrating shifted synthetic monopole and dipole recorded data waveforms, respectively, according to various embodiments of the invention.
Figure 8B:
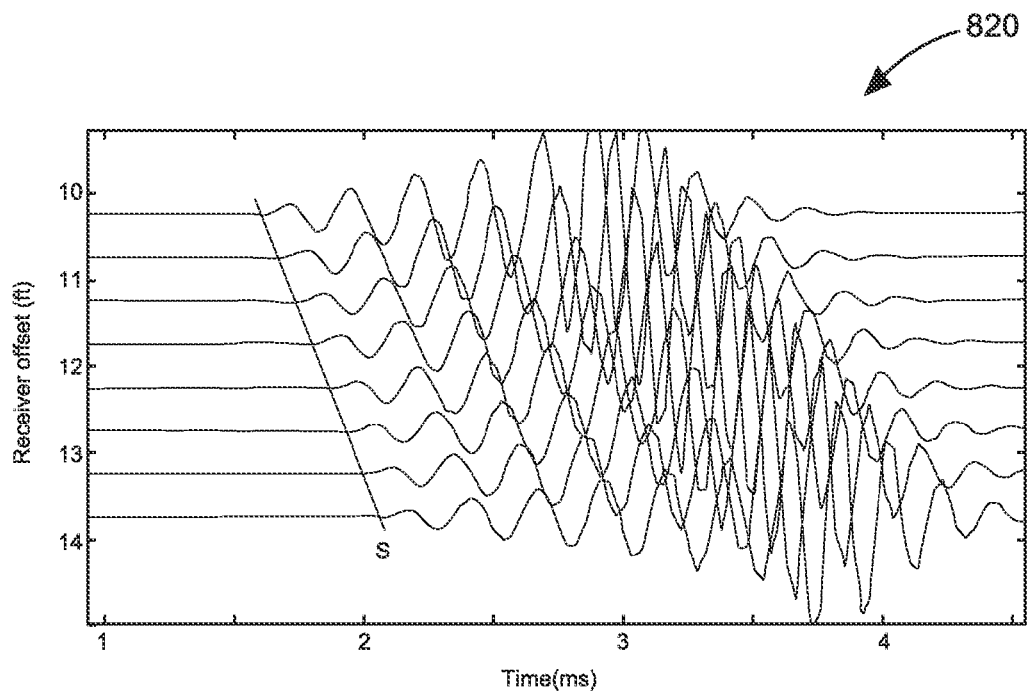

FIGS. 8A and 8B include graphs 810, 820 illustrating shifted synthetic monopole and dipole recorded data waveforms, respectively, according to various embodiments of the invention. In FIG. 8A, synthetic 8 kHz monopole array waveforms for a fast formation surrounding a borehole are shown. These waveforms result from recording raw data from a synthetic acoustic array in the time domain, with a monopole source having a center frequency of 8 kHz in a 8.5" borehole. The array of eight receivers was arranged with the receivers being in a line spaced about 6" apart from each other, with the source being approximately 10' from the closest one of the receivers. The presence of compressional (P), refracted shear (S), Stoneley (ST) and pseudo-Rayleigh (p-R) waves is indicated, as would be evident to one of ordinary skill in the art. Here the signals have been shifted according to the techniques described herein.

In FIG. 8B, 3 kHz synthetic dipole array waveforms for a fast formation surrounding a borehole are shown. These waveforms result from recording raw data from a synthetic acoustic array in the time domain, with a dipole source having a center frequency of 3 kHz in an 8.5" borehole. The transmitter and receiver configuration are the same as shown in FIG. 8A. Here, the formation compressional slowness was 70 microseconds/foot and shear slowness was 132 microseconds/foot. The borehole mud slowness was 215 microseconds/foot. Here again, the signals have been shifted according to the mechanism described herein.

Figure 9A:
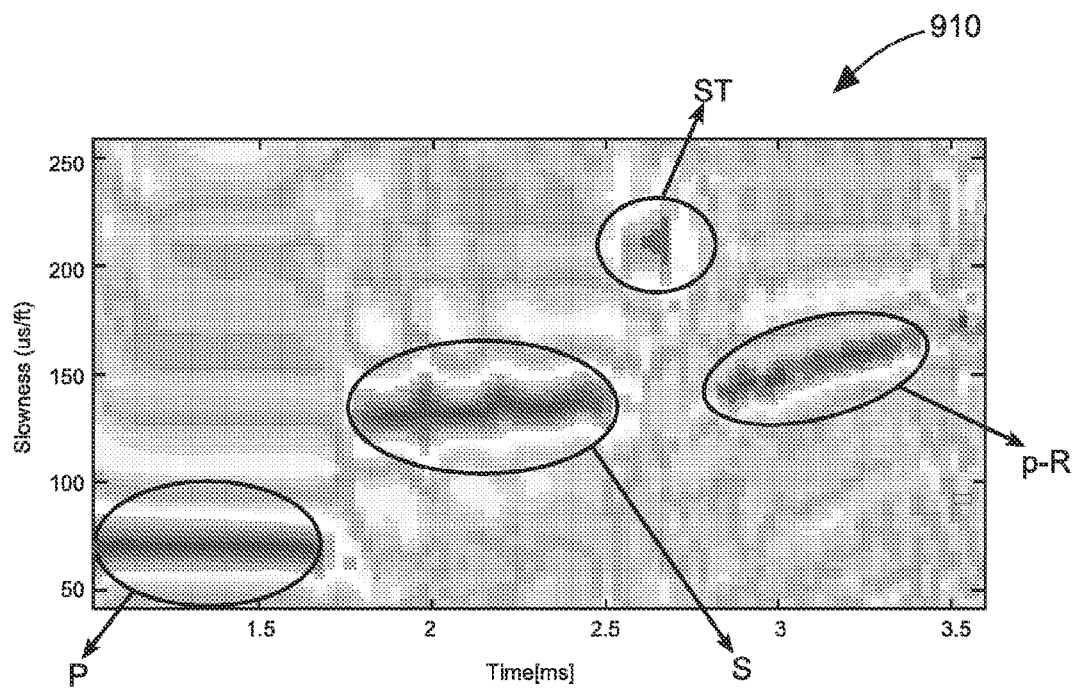
FIGS. 9A and 9B include time semblance graphs of synthetic monopole and dipole phase coherence, according to various embodiments of the invention.
Figure 9B:
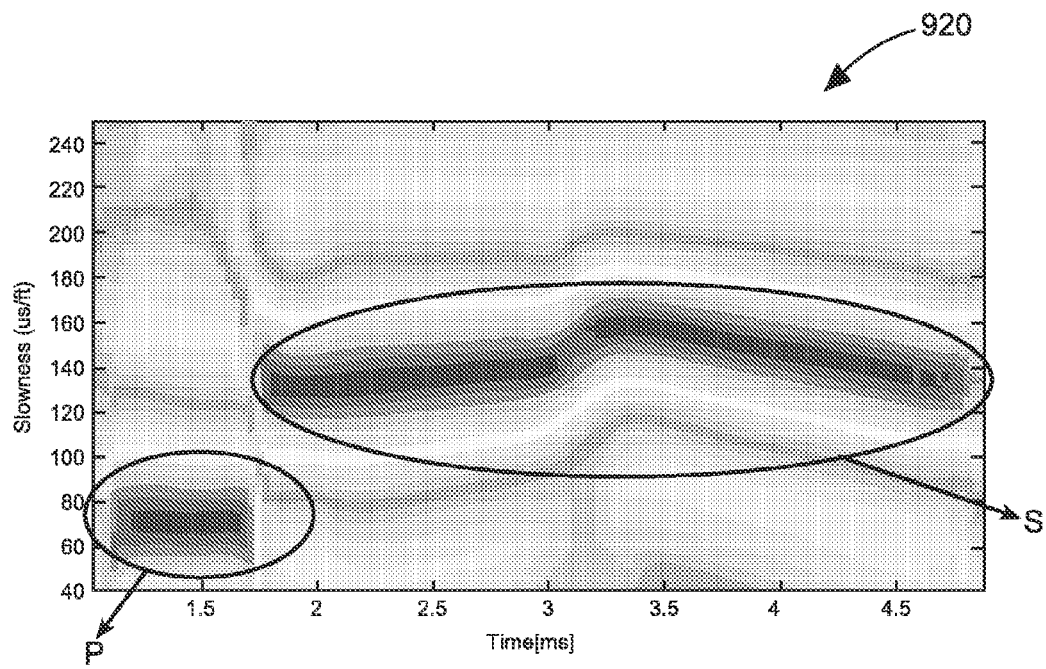

FIGS. 9A and 9B include time semblance graphs 910, 920 of synthetic monopole and dipole phase coherence, according to various embodiments of the invention. In FIG. 9A, the phase coherence time semblance graph 910 for a synthetic monopole source is shown. In this phase coherence time semblance image, compressional (P), refracted shear (S), Stoneley (ST), and pseudo-Rayleigh (p-R) waves are clearly visible.

In FIG. 9B, the phase coherence time semblance graph 920 for a synthetic dipole source is shown. Due to there being much less energy in the compressional wave associated with the dipole source, the compressional wave (P) is not as clearly visible in this figure, as it is in FIG. 9A. However, the dispersive nature of the shear wave (S) is visible in both FIGS. 9A and 9B. It can be noted that since these phase coherence images include differential phase values at each time and slowness, no destructive interference patterns are present.

Figure 10:
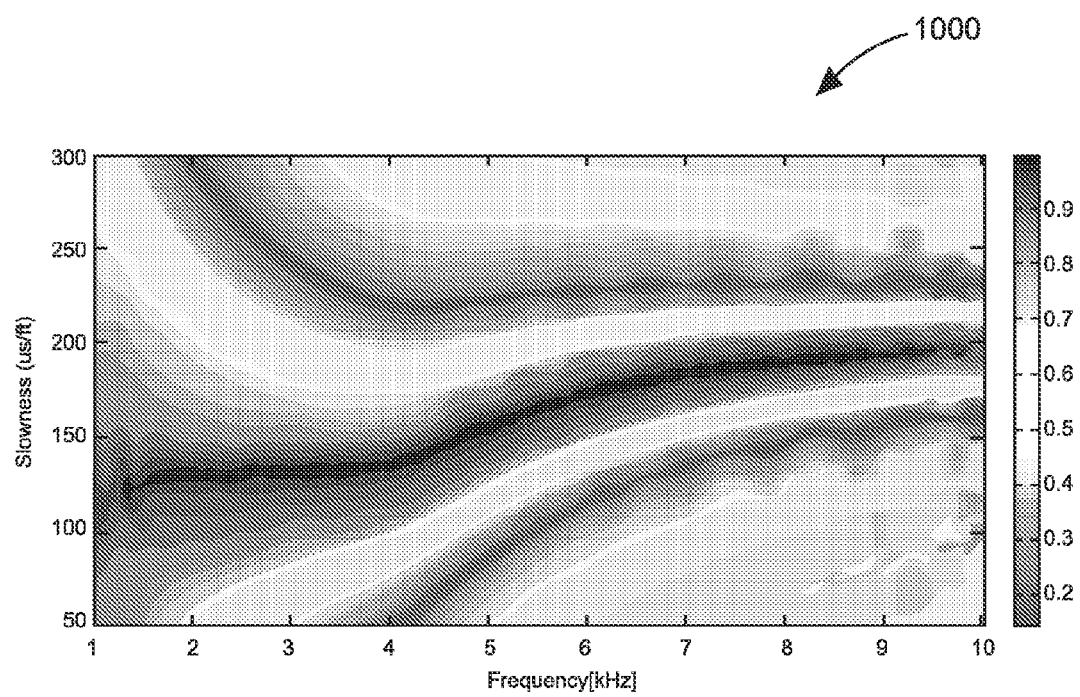
FIG. 10 is a phase coherence frequency semblance graph of a synthetic dipole source, according to various embodiments of the invention.

FIG. 10 is a phase coherence frequency semblance graph 1000 of a synthetic dipole source, according to various embodiments of the invention. The dipole source, which generates a flexural waveform, is dispersive in nature. The graph 1000 shows the phase coherence frequency semblance image of the flexural wave. In this case as well, due to the basic nature of differential phase values, no destructive interference patterns are present.

Apparatus and Systems

Figure 11:
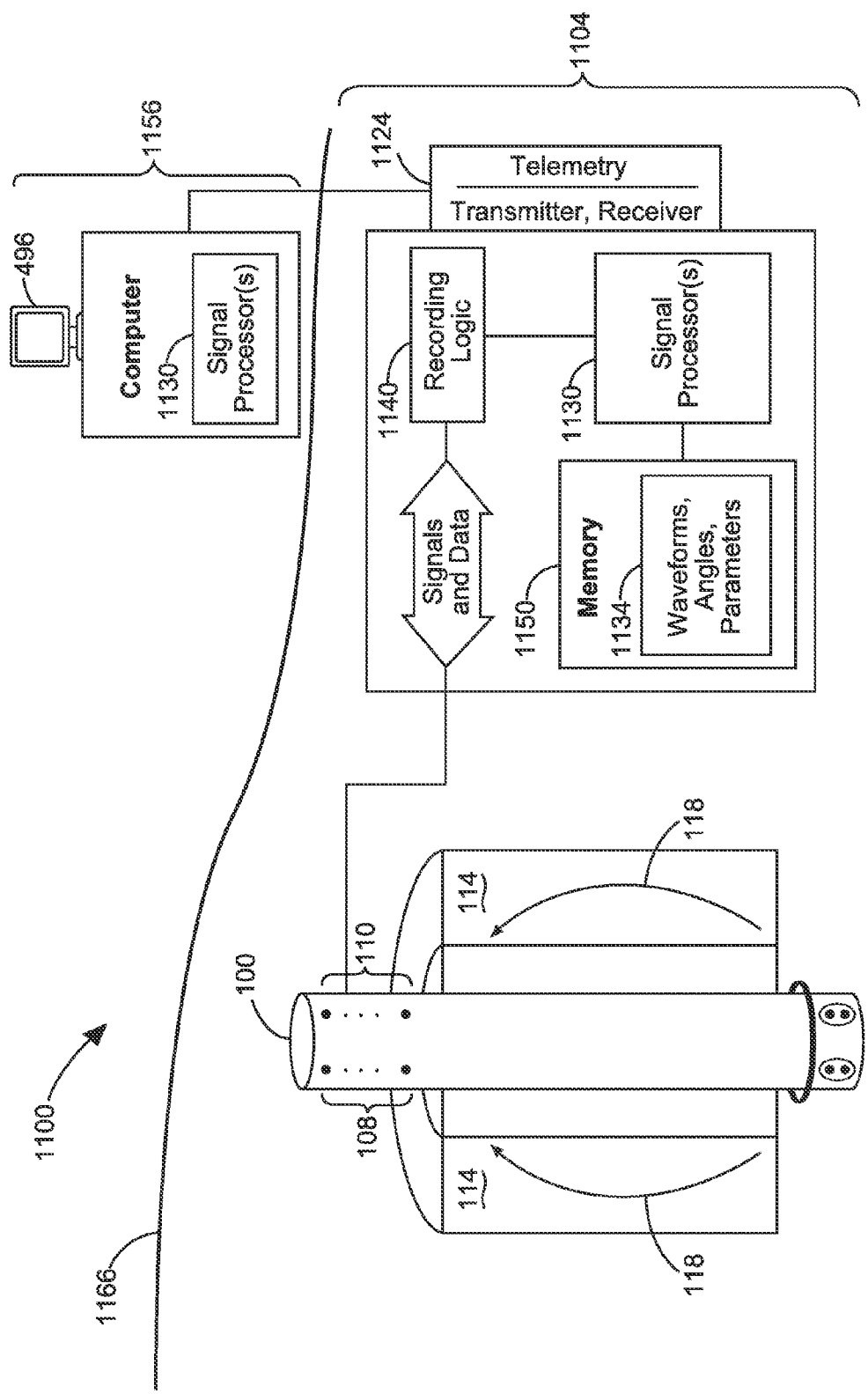
FIG. 11 is a block diagram of an apparatus and system according to various embodiments of the invention.

FIG. 11 is a block diagram of an apparatus 1104 and system 1100, according to various embodiments of the invention. The apparatus 1104 may comprise a number of components, including those described in the following paragraphs, as well as any of the components of the apparatus 100 shown in FIG. 1.

For example, referring now to FIGS. 1 and 11, it can be seen that the apparatus 1104 may comprise a set of two or more receivers $RX_N$, $RY_N$, logic 1140, and one or more signal processors 1130 to provide differential semblance values. The logic 1140 may operate to record raw signal data 1170 corresponding to energy waves 118 propagated through a geological formation 114 before being received by the set of receivers $RX_N$, $RY_N$.

The signal processor(s) 1130 may operate to transform the raw signal data 1170 into signal data, and to shift the signal data associated with the set of receivers $RX_N$, $RY_N$ in time or phase with respect to the signal data associated with a receiver reference point REF, transforming the signal data into shifted data. The processor(s) 1130 may further operate to multiply the shifted data by a complex conjugate of the signal data associated with the receiver reference point REF to provide differential phase values, and to sum and average the differential phase values to provide differential phase semblance values that can be published to one of a storage medium (e.g., memory 1150), a hardcopy printout, or a display (e.g., display 496).

The receivers may include azimuthally orthogonal arrays. Thus, the receivers $RX_N$, $RY_N$, may comprise a set of receivers arranged as azimuthally orthogonal receiver arrays.

Telemetry can be used to communicate the differential phase semblance values to the surface. Thus, the apparatus 1104 may comprise a telemetry transmitter (e.g., as part of a transceiver 1124) to communicate the differential phase semblance values to a logging facility 1156 at the surface 1166.

The apparatus 1104 may further comprise a memory 1150 to receive and store raw signal data 1170 and other waveform values. Position information, including angles of orientation, and equipment operational parameters, among others, may also be stored in the memory 1150, perhaps as part of a database 1134.

Figure 4:
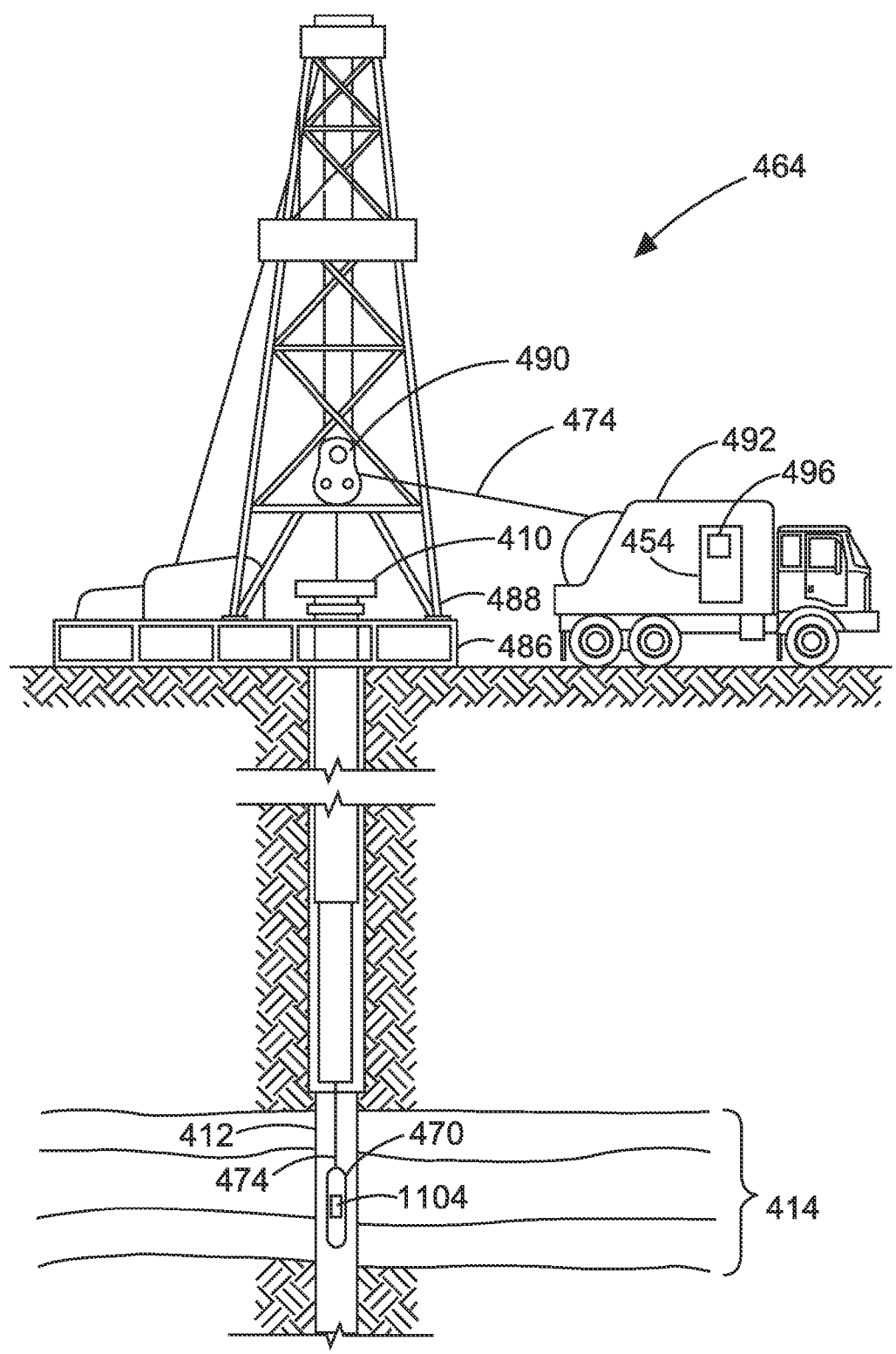
FIGS. 4-5 illustrate system embodiments of the invention.
Figure 5:
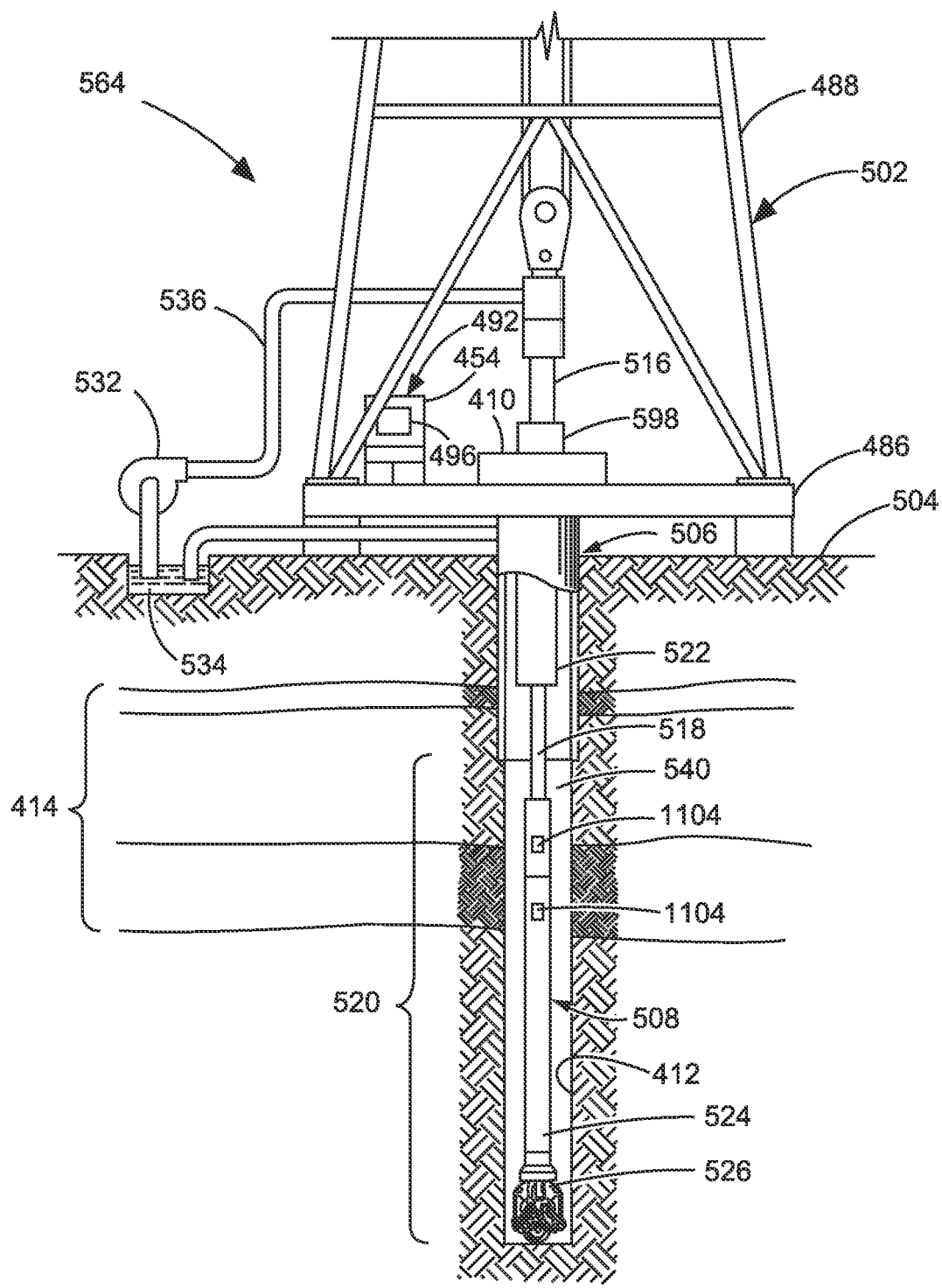

FIGS. 4-5 illustrate system embodiments of the invention. For example, FIG. 4 illustrates a wireline system 464 embodiment of the invention, and FIG. 5 illustrates a drilling rig system 564 embodiment of the invention. Thus, systems 464, 564 may comprise portions of a tool body 470 as part of a wireline logging operation, or of a downhole tool 524 as part of a downhole drilling operation.

FIG. 4 shows a well during wireline logging operations. A drilling platform 486 is equipped with a derrick 480 that supports a hoist 490. Here it is assumed that the drilling string has been temporarily removed from the borehole 412 to allow a wireline logging tool body 470, such as a probe or sonde that carries a sonic tool, to be lowered by wireline or logging cable 474 into the borehole 412. Typically, the tool body 470 is lowered to the bottom of the region of interest and subsequently pulled upward at a substantially constant speed.

During the upward trip, the apparatus 1104 included in the tool body 470 may be used to perform measurements in the borehole 412. The measurement data can be communicated to a surface logging facility 492 for storage, processing, and analysis. The logging facility 492 may be provided with electronic equipment for various types of signal processing, which may be implemented by any one or more of the components of the apparatus 1104 shown in FIG. 11. The log data is similar to that which may be gathered and analyzed during drilling operations (e.g., during logging while drilling (LWD) operations).

FIG. 5 shows a well during drilling operations. Drilling of oil and gas wells is commonly carried out using a string of drill pipes connected together so as to form a drilling string that is lowered through a rotary table 410 into a wellbore or borehole 412. Thus, it can be seen how a system 564 may form a portion of a drilling rig 502 located at the surface 504 of a well 506. The drilling rig 502 may provide support for a drill string 508. The drill string 508 may operate to penetrate a rotary table 410 for drilling a borehole 412 through subsurface formations 414. The drill string 508 may include a Kelly 516, drill pipe 518, and a bottom hole assembly 520, perhaps located at the lower portion of the drill pipe 518. In some embodiments, apparatus 1100 may be carried as part of the drill string 508 or the downhole tool 524.

The bottom hole assembly 520 may include drill collars 522, a downhole tool 524, and a drill bit 526. The drill bit 526 may operate to create a borehole 412 by penetrating the surface 504 and subsurface formations 414. The downhole tool 524 may comprise any of a number of different types of tools including MWD (measurement while drilling) tools, LWD tools, and others.

During drilling operations, the drill string 508 (perhaps including the Kelly 516, the drill pipe 518, and the bottom hole assembly 520) may be rotated by the rotary table 410. In addition to, or alternatively, the bottom hole assembly 520 may also be rotated by a motor (e.g., a mud motor) that is located downhole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation 414 cuttings created by operating the drill bit 526.

The apparatus 100, 1104; transmitters 102, 104, 106; arrays 108, 110; boreholes 112, 412; formations 114, 414; fluid 120; rotary table 410; workstations 454, 1156; systems 464, 564, 1100; tool body 470; logging cable 474; drilling platform 486; derrick 480; hoist 490; logging facility 492; display 496; drilling rig 502; well 506; drill string 508; Kelly 516; drill pipe 518; bottom hole assembly 520; drill collars 522; downhole tool 524; drill bit 526; mud pump 532; mud pit 534; hose 536; transceiver 1124; signal processors 1130; database 1134; logic 1140; memory 1150; and individual receivers $RX_N$, $RY_N$ may all be characterized as "modules" herein. Such modules may include hardware circuitry, and/or a processor and/or memory circuits, software program modules and objects, and/or firmware, and combinations thereof, as desired by the architect of the apparatus 1104 and systems 464, 564, 1100, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling operations, and thus, various embodiments are not to be so limited. The illustrations of apparatus 1104 and systems 464, 564, 1100 are intended to provide a general understanding of the structure of various embodiments, and they are not intended to serve as a complete description of all the elements and features of apparatus and systems that might make use of the structures described herein.

Applications that may incorporate the novel apparatus and systems of various embodiments include a variety of electronic systems, such as televisions, cellular telephones, personal computers, workstations, radios, video players, vehicles, and location technology (e.g., GPS (Global Positioning System) location technology), signal processing for geothermal tools and smart transducer interface node telemetry systems, among others.

Thus, a system 464, 564, 1100 may comprise a down hole tool and one or more components of the apparatus 100, 1104, as described previously. The downhole tool may comprise a wireline tool or a measurement while drilling tool, among others. In some embodiments, sets of receivers $RX_N$, $RY_N$ (e.g., arranged as arrays) are attached to the down hole tool. The recording logic 1140, as part of the apparatus, may be attached to the tool, or form part of a surface computer. Similarly, the signal processors 1130, as part of the apparatus, may also be attached to the tool, or form part of a surface computer. Thus, the data processing tasks can be divided between two or more processors 1130, comprising a surface computer and a sub-surface processor communicatively coupled to the surface computer. Some embodiments include a number of methods.

Methods

Figure 6:
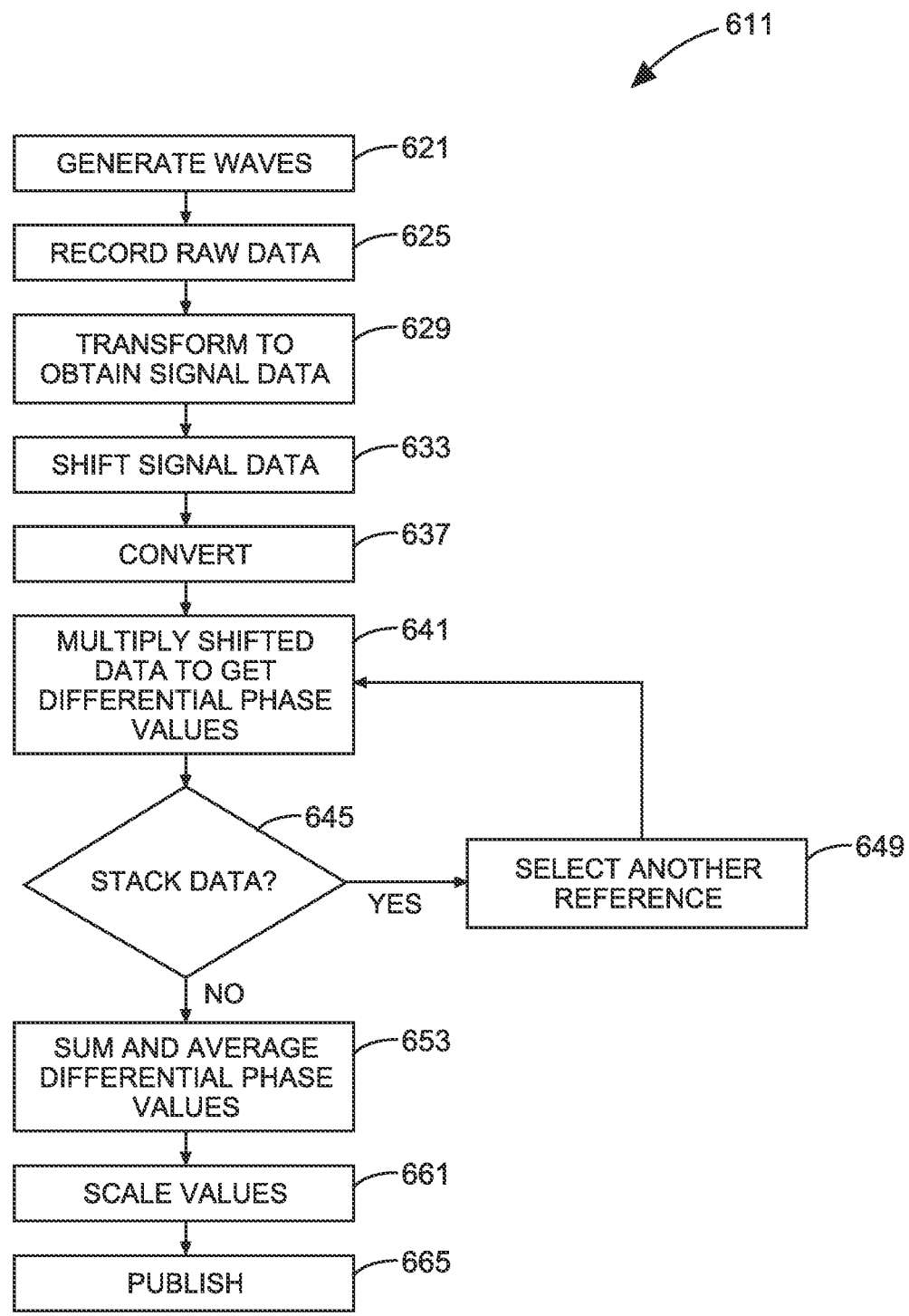
FIG. 6 is a flow chart illustrating several methods according to various embodiments of the invention.

For example, FIG. 6 is a flow chart illustrating several methods according to various embodiments of the invention. For example, a processor-implemented method 611 to execute on one or more processors that perform the methods to may comprise shifting signal data with respect to a reference point (which may be located anywhere with respect to a transmitter and one or more of the receivers— including at the center of reception of one of the receivers, or elsewhere), multiplying the shifted data, summing and averaging the resulting differential phase values, and publishing the results as the differential phase values, or information derived from the values (e.g., scaled differential phase values).

In some embodiments, the method 611 may begin with generating waves in the formation, and digitizing the waveforms as raw signal data. Thus, at block 621, the method 611 may comprise generating the energy waves using a set of transmitters, perhaps by driving a set of transmitters (e.g., one or more ring transmitters, and/or one or more dipole transmitters) to generate acoustic waves in the geological formation. The method 611 may continue on to block 625 with recording raw signal data as a digitized form of the energy waves in a storage medium.

When shifting the signal data in time, the raw, digitized data may be transformed into analytical signal data. Thus, at block 629, the method 611 may comprise transforming the raw signal data as a digitized form of the energy waves into analytical signal data. Thereafter, the analytical signal data can be brought into the frequency domain. Thus, the activity at block 629 may comprise transforming the analytical signal data in the time domain to frequency domain data, the frequency domain data comprising the signal data.

When shifting the signal data in phase, the raw signal data can be brought directly into the frequency domain. Thus, at block 629, the method 611 may comprise transforming the raw signal data as a digitized form of the energy waves in the time domain to frequency domain data, the frequency domain data comprising the signal data.

The method 611 may go on to block 633 to include shifting signal data associated with a set of receivers, in time or phase with respect to signal data associated with a receiver reference point, to transform the signal data into shifted data, wherein the signal data corresponds to energy waves propagated through a geological formation before being received by the set of receivers.

When shifting the signal data in time, the analytical signal data can be brought into the frequency domain. Thus, the activity at block 633 may comprise transforming analytical signal data in the time domain to frequency domain data, the frequency domain data comprising the signal data.

When shifting the signal data in time, the shifted data can be brought back into the time domain. Thus, the method 611 may go on to block 637 to include, before multiplying (at block 641), converting the shifted data back into the time domain.

The method 611 may go on to block 641 to include multiplying the shifted data by a complex conjugate of the signal data associated with the receiver reference point to provide differential phase values.

Any of the receivers in a set of receivers can serve as a reference receiver. To improve performance under noisy conditions, the location of the reference receiver can be varied to generate additional differential phase values. The separate sets of differential phase values, each set associated with a different reference receiver, can be stacked, to help reduce incoherent noise.

When stacking occurs, each receiver can be chosen as a reference receiver in turn. However, as noted above, it should be recognized that this activity may lead to some repetition in the data. For example, there may be a phase difference between receivers 1 and 2, and between receivers 2 and 1—the same difference, but with an opposite sign. Thus, the repeated differences should be considered only one time, otherwise they will cancel each other out.

If no stacking is to occur, the method 611 may continue on to block 653 from block 645, with summing and averaging the differential phase values to provide differential phase semblance values.

However, if the shifted data is to be stacked, then the method 611 may continue on to block 649 from block 645, to include selecting additional reference receivers, thereafter repeating the activities at blocks 641, 645, and 649.

Thus, additional differential phase values can be obtained by moving the reference point and stacking the differential phase values—after time-shifting the differential phase values to line up with each other. Therefore, the activities at block 641 and 649 may comprise moving the receiver reference point to a different physical location, repeating the multiplying to provide additional differential phase values for signal data associated with the different physical location, and summing and averaging the differential phase values and the additional differential phase values to provide the differential phase semblance values.

In some embodiments, the activity at blocks 641, 649, and 653 may thus include selecting a receiver from the set of receivers as a reference receiver located at a location other than the receiver reference point, multiplying to provide additional differential phase values for signal data associated with the reference receiver, and summing and averaging the differential phase values and the additional differential phase values to provide the differential phase semblance values as stacked values.

When shifting in time, averaging occurs at various points in time. Thus, the averaging activity at block 653 may comprise averaging the summed differential phase values at selected points in time.

When shifting in phase, averaging occurs at various frequencies. Thus, the averaging activity at block 653 may comprise averaging the summed differential phase values at selected frequencies.

Differential phase semblance values can be scaled prior to publication. Thus, the method 611 may continue on to block 661 to include prior to the publishing (at block 665), scaling the differential phase semblance values to provide the information derived from the differential phase semblance values.

In most embodiments, the method 611 continues on to block 665 to include publishing the differential phase semblance values, or information derived from the differential phase semblance values to one of a storage medium, a hardcopy printout, or a display.

Publication can take the form of a time semblance image. Thus, the activity at block 665 may comprise publishing a phase coherence time semblance image when the shifting comprises shifting the signal data in time.

Publication can also take the form of a frequency semblance image. Thus, the activity at block 665 may comprise publishing a phase coherence frequency semblance image when the shifting comprises shifting the signal data in phase.

Additional activities forming a part of the methods 611 are listed in the activities for methods claimed below, and described above with respect to FIGS. 2-3. Thus, it should be noted that the methods described herein do not have to be executed in the order described, or in any particular order. Moreover, various activities described with respect to the methods identified herein can be executed in iterative, serial, or parallel fashion. Some activities may be added, and some of the included activities may be left out. Other activities may be substituted, one for another. Information, including parameters, commands, operands, and other data, can be sent and received in the form of one or more carrier waves.

Articles of Manufacture

Figure 7:
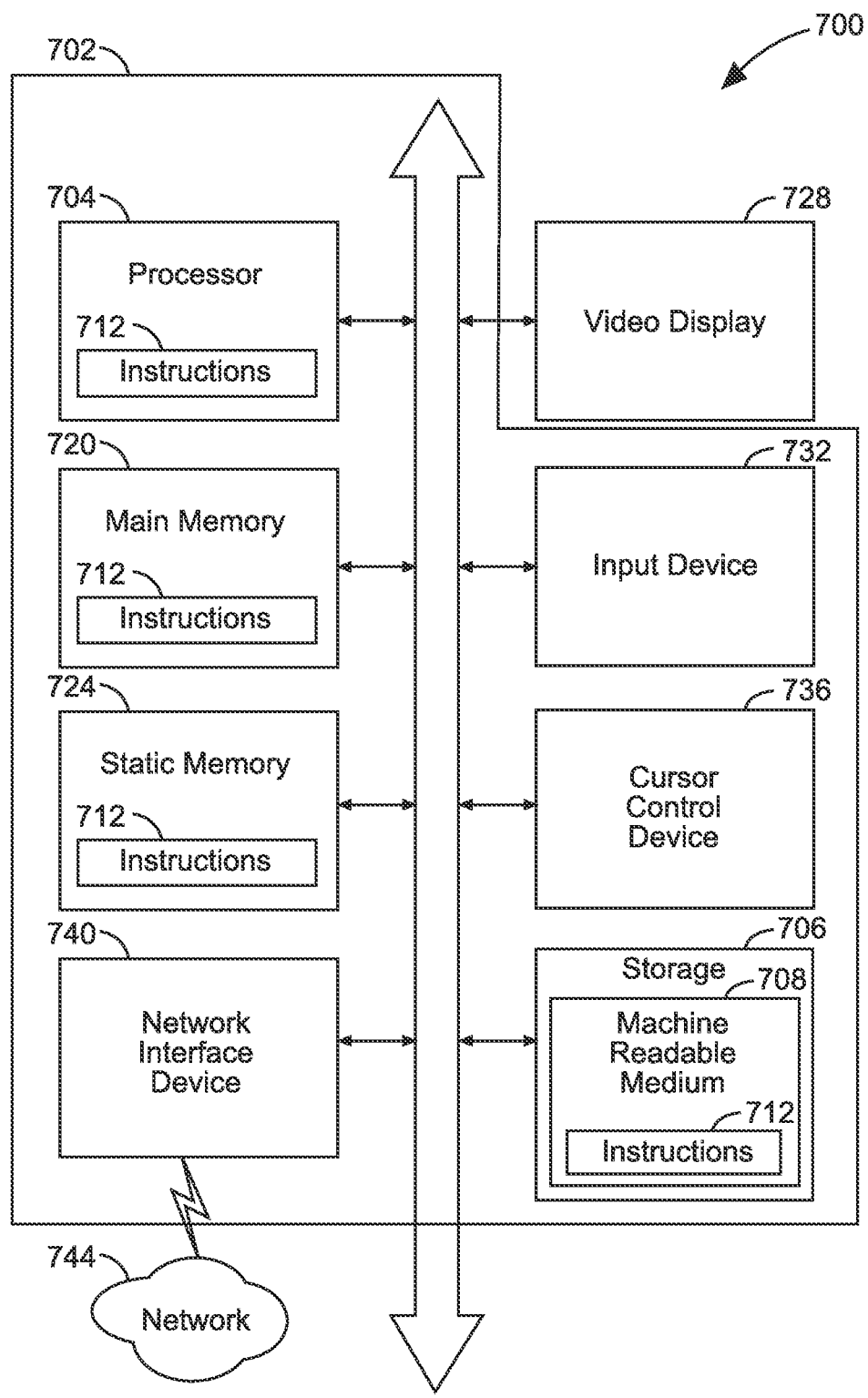
FIG. 7 is a block diagram of an article according to various embodiments of the invention.

FIG. 7 is a block diagram of an article 700 of manufacture, including a specific machine 702, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. In some embodiments, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 700 of manufacture, such as a computer, a memory system, a magnetic or optical disk, some other storage device, and/or any type of electronic device or system may include one or more processors 704 coupled to a machine-readable medium 708 such as a memory (e.g., removable storage media, as well as any memory including an electrical, optical, or electromagnetic conductor comprising non-transitory, tangible media) having instructions 712 stored thereon (e.g., computer program instructions), which when executed by the one or more processors 704 result in the machine 702 performing any of the actions described with respect to the methods above.

The machine 702 may take the form of a specific computer system having a processor 704 coupled to a number of components directly, and/or using a bus 716. Thus, the machine 702 may be similar to or identical to the workstation 454 shown in FIGS. 4 and 5, the processor 1130 in the apparatus 1104 of FIG. 11, or the workstation 1156 in the system 1100 of FIG. 11.

Turning now to FIG. 7, it can be seen that the components of the machine 702 may include main memory 720, static or non-volatile memory 724, and mass storage 706. Other components coupled to the processor 704 may include an input device 732, such as a keyboard, or a cursor control device 736, such as a mouse. An output device 728, such as a video display, may be located apart from the machine 702 (as shown), or made as an integral part of the machine 702.

A network interface device 740 to couple the processor 704 and other components to a network 744 may also be coupled to the bus 716. The instructions 712 may be transmitted or received over the network 744 via the network interface device 740 utilizing any one of a number of well-known transfer protocols (e.g., HyperText Transfer Protocol). Any of these elements coupled to the bus 716 may be absent, present singly, or present in plural numbers, depending on the specific embodiment to be realized.

The processor 704, the memories 720, 724, and the storage device 706 may each include instructions 712 which, when executed, cause the machine 702 to perform any one or more of the methods described herein. In some embodiments, the machine 702 operates as a standalone device or may be connected (e.g., networked) to other machines. In a networked environment, the machine 702 may operate in the capacity of a server or a client machine in server-client network environment, or as a peer machine in a peer-to-peer (or distributed) network environment.

The machine 702 may comprise a personal computer (PC), a workstation, a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 702 is illustrated, the term "machine" shall also be taken to include any collection of machines that individually or jointly execute a set (or multiple sets) of instructions to perform any one or more of the methodologies discussed herein.

While the machine-readable medium 708 is shown as a single medium, the term "machine-readable medium" should be taken to include a single medium or multiple media (e.g., a centralized or distributed database, and/or associated caches and servers, and or a variety of storage media, such as the registers of the processor 704, memories 720, 724, and the storage device 706 that store the one or more sets of instructions 712. The term "machine-readable medium" shall also be taken to include any medium that is capable of storing, encoding or carrying a set of instructions for execution by the machine and that cause the machine 702 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

CONCLUSION

The mechanism described herein is different from prior approaches, providing a reduced dynamic range using the difference in phase between receivers (and not merely the absolute value of phase) to overcome artificial destructive interference and wrapping. Moreover, using the differential phase mechanism described herein, coherence at very low signal levels (e.g., near or at zero) is indicated as such, rather than being indicated as "zero" coherence. As a result, a high resolution image is produced, more so than with other available algorithms. Stacking can be used to reduce incoherent noise.

Thus, using the apparatus, systems, and methods disclosed herein, those in the petroleum recovery industry and other industries may now be able to more accurately and rapidly assess the properties of boreholes and geologic formations. Increased operational efficiency and client satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description and the figures, with each claim standing on its own as a separate embodiment.

What is claimed is:

1. An apparatus, comprising:
    a set of receivers arranged as azimuthally separated receiver arrays, each receiver array having front and back receivers to form sum and difference channels;
    logic to record raw signal data corresponding to energy waves propagated through a geological formation before being received by the set of receivers; and
    a signal processor to transform the raw signal data into signal data, to shift the signal data associated with the set of receivers in time or phase with respect to the signal data associated with a receiver reference point, to multiply the shifted data by a complex conjugate of the signal data associated with the receiver reference point to provide differential phase values associated with the set of receivers, and to sum and average the differential phase values over the set of receivers at each time of selected times for a given slowness or over the set of receivers at each frequency of selected frequencies for a given slowness to provide differential phase semblance values; and
    a device operable with the signal processor to publish a slowness time semblance image or a slowness frequency semblance image based on the differential phase semblance values, the device being one of a storage medium, a hardcopy printout device, or a display.

2. The apparatus of claim 1, wherein the apparatus includes a set of transmitters to generate the energy waves in the geological formation.

3. The apparatus of claim 1, further comprising:
    a telemetry transmitter to communicate the differential phase semblance values to a surface logging facility.

4. A system, comprising:
    a down hole tool;
    a set of receivers attached to the downhole tool, the set of receivers arranged as azimuthally separated receiver arrays, each receiver array having front and back receivers to form sum and difference channels;
    logic attached to the downhole tool to record raw signal data corresponding to energy waves propagated through a geological formation before being received by the set of receivers; and
    a signal processor to transform the raw signal data into signal data, to shift the signal data associated with the set of receivers in time or phase with respect to the signal data associated with a receiver reference point, to multiply the shifted data by a complex conjugate of the signal data associated with the receiver reference point to provide differential phase values associated with the set of receivers, and to sum and average the differential phase values over the set of receivers at each time of selected times for a given slowness or over the set of receivers at each frequency of selected frequencies for a given slowness to provide differential phase semblance values; and
    a device operable with the signal processor to publish a slowness time semblance image or a slowness frequency semblance image based on the differential phase semblance values, the device being one of a storage medium, a hardcopy printout device, or a display.

5. The system of claim 4, wherein the downhole tool comprises one of a wireline tool or a measurement while drilling tool.

6. The system of claim 4, wherein the signal processor is divided into at least two processors comprising a surface computer and a sub-surface processor communicatively coupled to the surface computer.

7. A processor-implemented method to execute on one or more processors that perform the method, comprising:
    receiving, by a set of receivers arranged as azimuthally separated receiver arrays, each receiver array having front and back receivers to form sum and difference channels, received energy waves, the received energy waves resulting from generated energy waves propagating through a geological formation;

shifting signal data associated with the set of receivers, in time or phase with respect to signal data associated with a receiver reference point;

multiplying the shifted data by a complex conjugate of the signal data associated with the receiver reference point to provide differential phase values associated with the set of receivers;

summing and averaging the differential phase values over the set of receivers at each time of selected times for a given slowness or over the set of receivers at each frequency of selected frequencies for a given slowness to provide differential phase semblance values; and publishing a slowness time semblance image or a slowness frequency semblance image, the differential phase semblance values, to one of a storage medium, a hardcopy printout, or a display.

8. The method of claim 7, further comprising:
generating the energy waves using a set of transmitters; and
recording raw signal data as a digitized form of the energy waves in a storage medium.

9. The method of claim 8, wherein generating the energy waves further comprises:
driving the set of transmitters to generate acoustic waves in the geological formation.

10. The method of claim 7, wherein the shifting comprises shifting the signal data in time, further comprising:
transforming analytical signal data in the time domain to frequency domain data, the frequency domain data comprising the signal data.

11. The method of claim 10, further comprising:
transforming raw signal data as a digitized form of the energy waves into the analytical signal data.

12. The method of claim 7, wherein the shifting comprises shifting the signal data in time, further comprising:
transforming analytical signal data in the time domain to frequency domain data, the frequency domain data comprising the signal data.

13. The method of claim 7, wherein the shifting comprises shifting the signal data in time, further comprising:
before the multiplying, converting the shifted data back into the time domain.

14. The method of claim 7, wherein the shifting comprises shifting the signal data in time, and wherein the averaging comprises:
averaging the summed differential phase values at selected points in time.

15. The method of claim 7, wherein the shifting comprises shifting the signal data in phase, further comprising:
transforming raw signal data as a digitized form of the energy waves in the time domain to frequency domain data, the frequency domain data comprising the signal data.

16. The method of claim 7, wherein the shifting comprises shifting the signal data in phase, and wherein the averaging comprises:
averaging the summed differential phase values at selected frequencies.

17. The method of claim 7, wherein the publishing comprises:
publishing a phase coherence time semblance image when the shifting comprises shifting the signal data in time.

18. The method of claim 7, further comprising:
moving the receiver reference point to a different physical location;
repeating the multiplying to provide additional differential phase values for signal data associated with the different physical location; and
summing and averaging the differential phase values and the additional differential phase values to provide the differential phase semblance values as stacked values.

19. The method of claim 7, further comprising:
selecting a receiver from the set of receivers as a reference receiver located at a location other than the receiver reference point;
multiplying to provide additional differential phase values for signal data associated with the reference receiver; and
summing and averaging the differential phase values and the additional differential phase values to provide the differential phase semblance values as stacked values.

20. An article including a non-transitory, machine-accessible medium having instructions stored therein, wherein the instructions, when executed, result in a machine performing:
receiving, by a set of receivers arranged as azimuthally separated receiver arrays, each receiver array having front and back receivers to form sum and difference channels, received energy waves, the received energy waves resulting from generated energy waves propagating through a geological formation;
shifting signal data associated with the set of receivers, in time or phase with respect to signal data associated with a receiver reference point;
multiplying the shifted data by a complex conjugate of the signal data associated with the receiver reference point to provide differential phase values associated with the set of receivers;
summing and averaging the differential phase values over the set of receivers at each time of selected times for a given slowness or over the set of receivers at each frequency of selected frequencies for a given slowness to provide differential phase semblance values; and
publishing a slowness time semblance image or a slowness frequency semblance image based on the differential phase semblance values to one of a storage medium, a hardcopy printout; or a display.

21. The article of claim 20, wherein the instructions, when executed, result in the machine performing:
prior to the publishing, scaling the differential phase semblance values to provide information derived from the differential phase semblance values.

22. The article of claim 20, wherein the publishing comprises:
publishing a phase coherence frequency semblance image when the shifting comprises shifting the signal data in phase.

* * * * *